United States Patent
Liang et al.

(10) Patent No.: US 8,415,865 B2
(45) Date of Patent: *Apr. 9, 2013

(54) LIGHT-GUIDE TYPE ILLUMINATION DEVICE

(75) Inventors: Chun-Wei Liang, New Taipei (TW); Chung-En Lee, Kaohsiung (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/291,184

(22) Filed: Nov. 8, 2011

(65) Prior Publication Data

US 2012/0182757 A1 Jul. 19, 2012

Related U.S. Application Data

(63) Continuation-in-part of application No. 13/008,199, filed on Jan. 18, 2011, now Pat. No. 8,154,181.

(51) Int. Cl.
*H01J 1/02* (2006.01)
(52) U.S. Cl.
USPC .............. 313/46; 313/493; 313/634; 313/635
(58) Field of Classification Search .................... 313/46, 313/493, 634, 635
See application file for complete search history.

(56) References Cited

U.S. PATENT DOCUMENTS 5,987,199 A * 11/1999 Zarian et al. .................... 385/31
2003/0006230 A1* 1/2003 Kaji et al. ...................... 219/620

* cited by examiner

*Primary Examiner* — Vip Patel
(74) *Attorney, Agent, or Firm* — Li & Cai Intellectual Property (USA) Office

(57) ABSTRACT

A light-guide type illumination device includes a heat-dissipating unit, a conductive unit, a light-emitting unit and a light-guiding unit. The heat-dissipating unit includes a heat-dissipating body. The conductive unit and the light-emitting unit are respectively disposed on a first side and a second side of the heat-dissipating body. The light-emitting unit includes at least one light-emitting element electrically connected to the conductive unit for generating light beams. The light-guiding unit includes at least one light-guiding element disposed above the light-emitting unit. The light-guiding element has a light input surface formed on a bottom side thereof for receiving the light beams and an optical surface-treated layer formed on at least one lateral surface thereof. Hence, the instant disclosure can provide an annular 360-degree light-emitting range by matching the light-emitting unit and the light-guiding unit, thus any type of conventional energy-saving bulb can be replaced by the illumination device.

22 Claims, 10 Drawing Sheets

LIGHT-GUIDE TYPE ILLUMINATION DEVICE

CROSS REFERENCE TO RELATED APPLICATION

This application is a continuation-in-part of U.S. application Ser. No. 13/008,199, filed on Jan. 18, 2011, and entitled "light-guide type light-emitting device", now pending, the entire disclosures of which are incorporated herein by reference.

BACKGROUND OF THE INVENTION

1. Field of the Invention

The instant disclosure relates to an illumination device, and more particularly, to a light-guide type illumination device.

2. Description of Related Art

With the rapid development of economy, energy consumption by humans is also gradually increasing. As a result, energy-saving electronic devices are gaining widespread popularity. For example, in lighting applications, conventional incandescent light bulbs and fluorescent lamps are gradually phased out by energy-saving light bulbs, which have longer service life, excellent efficiency, and better luminosity.

Although conventional incandescent light bulbs are replaceable by energy-saving light bulbs, the known energy-saving light bulbs use mercury to generate ultraviolet (UV) light for exciting fluorescent coating on the bulbs in producing visible light. Under increasing environmental awareness, the use of mercury-containing energy-saving light bulbs will soon be completely prohibited. Moreover, one type of often seen LED light bulb has restricted illuminating angle and produces significant glare. As a consequence, the mounting of the aforementioned LED light bulbs would vary from the conventional light bulbs, and the user is more susceptible to discomfort due to the glare. In summary, the illumination patterns of the LED light bulbs are generally different from the conventional light bulbs. Therefore, direct replacements of the conventional light bulbs by the LED light bulbs are yet applicable. In some instances, the entirety of the lighting fixture has to be replaced along with the conventional light bulbs to make use the LED light bulbs. The change of the lighting fixtures is neither cost-effective nor encourage the use of LED lightings.

SUMMARY OF THE INVENTION

One particular aspect of the instant disclosure is to provide a light-guide type illumination device. The illumination device can transmit directional light sources of at least one LED into omni-directional light sources by a light-guiding technique in order to provide an annular 360-degree light-emitting range. In addition, because the illumination pattern of the illumination device is similar to that of the conventional energy-saving bulb, both the conventional direct-type bulb and the conventional lateral-type bulb can be replaced by the illumination device of the instant disclosure.

To achieve the above-mentioned advantages, one embodiment of the instant disclosure provides a light-guide type illumination device, comprising: a heat-dissipating unit, a conductive unit, a light-emitting unit and a light-guiding unit. The heat-dissipating unit includes a heat-dissipating body. The conductive unit is disposed on a first side of the heat-dissipating body. The light-emitting unit is disposed on a second side of the heat-dissipating body, wherein the light-emitting unit includes at least one light-emitting element electrically connected to the conductive unit for generating light beams. The light-guiding unit includes at least one light-guiding element disposed above the light-emitting unit, wherein the at least one light-guiding element has a light input surface formed on a bottom side thereof for receiving the light beams and a surface-treated optical layer formed on at least one lateral surface thereof.

In conclusion, the instant disclosure can provide an annular 360-degree light-emitting range by matching the light-emitting unit and the light-guiding unit, thus any type of conventional energy-saving bulb can be replaced by the light-guide type illumination device.

To further understand the techniques, means and effects the instant disclosure takes for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention that they be used for limiting the instant disclosure.

DETAILED DESCRIPTION OF THE PREFERRED EMBODIMENTS

First Embodiment

Referring to FIGS. 1A to 1F, where the first embodiment of the instant disclosure provides a light-guide type illumination device Z, comprising: a heat-dissipating unit 1, a conductive unit 2, a light-emitting unit 3 and a light-guiding unit 4.

Figure 1A:
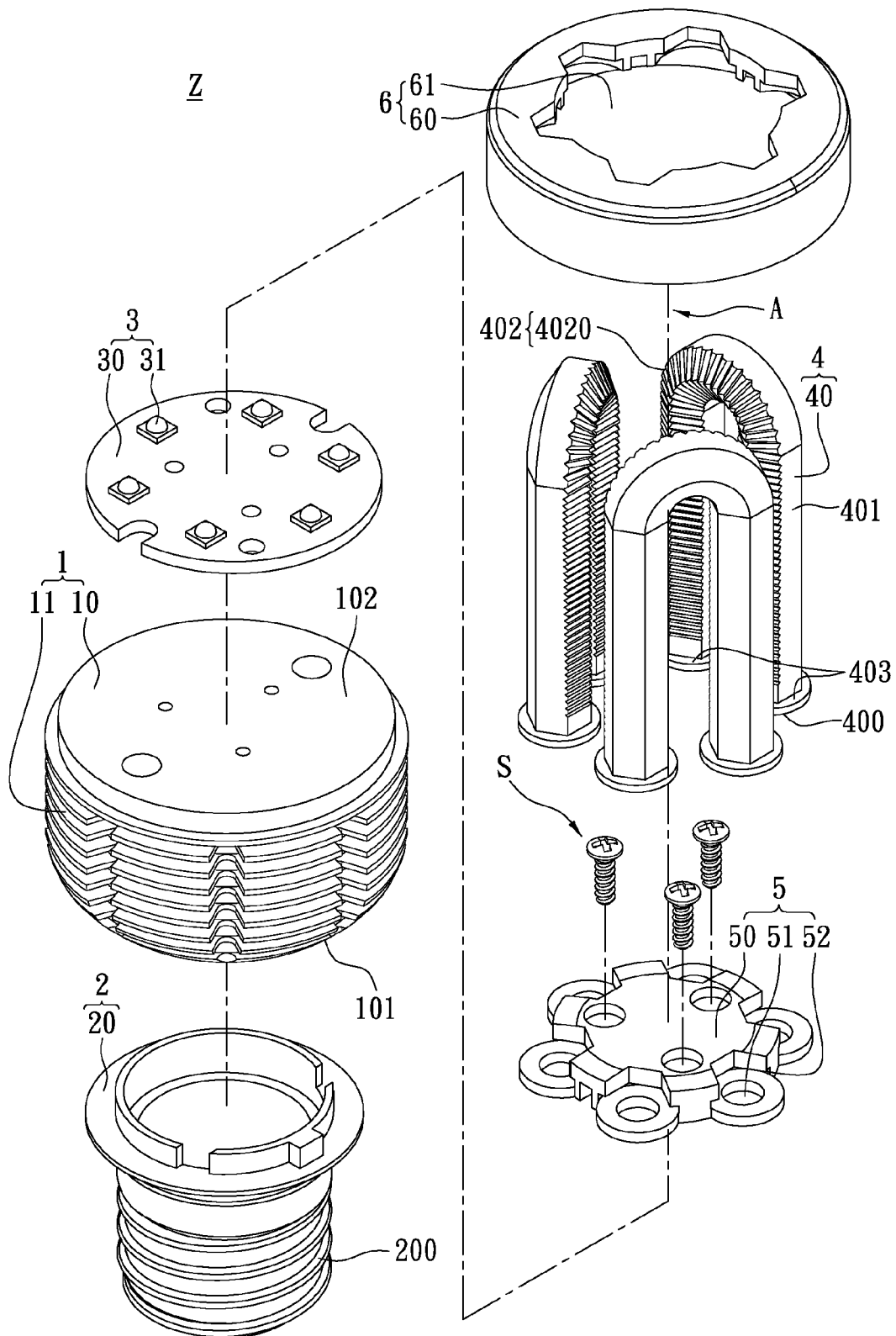
FIG. 1A shows a perspective, exploded, schematic view of the light-guiding type illumination device according to the first embodiment of the instant disclosure.

Referring to FIG. 1A, the heat-dissipating unit 1 includes a heat-dissipating body 10 and a plurality of heat-dissipating fins 11 mated with the heat-dissipating body 10. For example, the heat-dissipating fins 11 can be integrated with or extra assembled on the outer peripheral surface of the heat-dissipating body 10. However, the heat-dissipating unit 1 used in this embodiment is merely an example and is not meant to limit the instant disclosure, thus any structure having a heat-dissipating function can be applied to the instant disclosure.

Figure 1B:
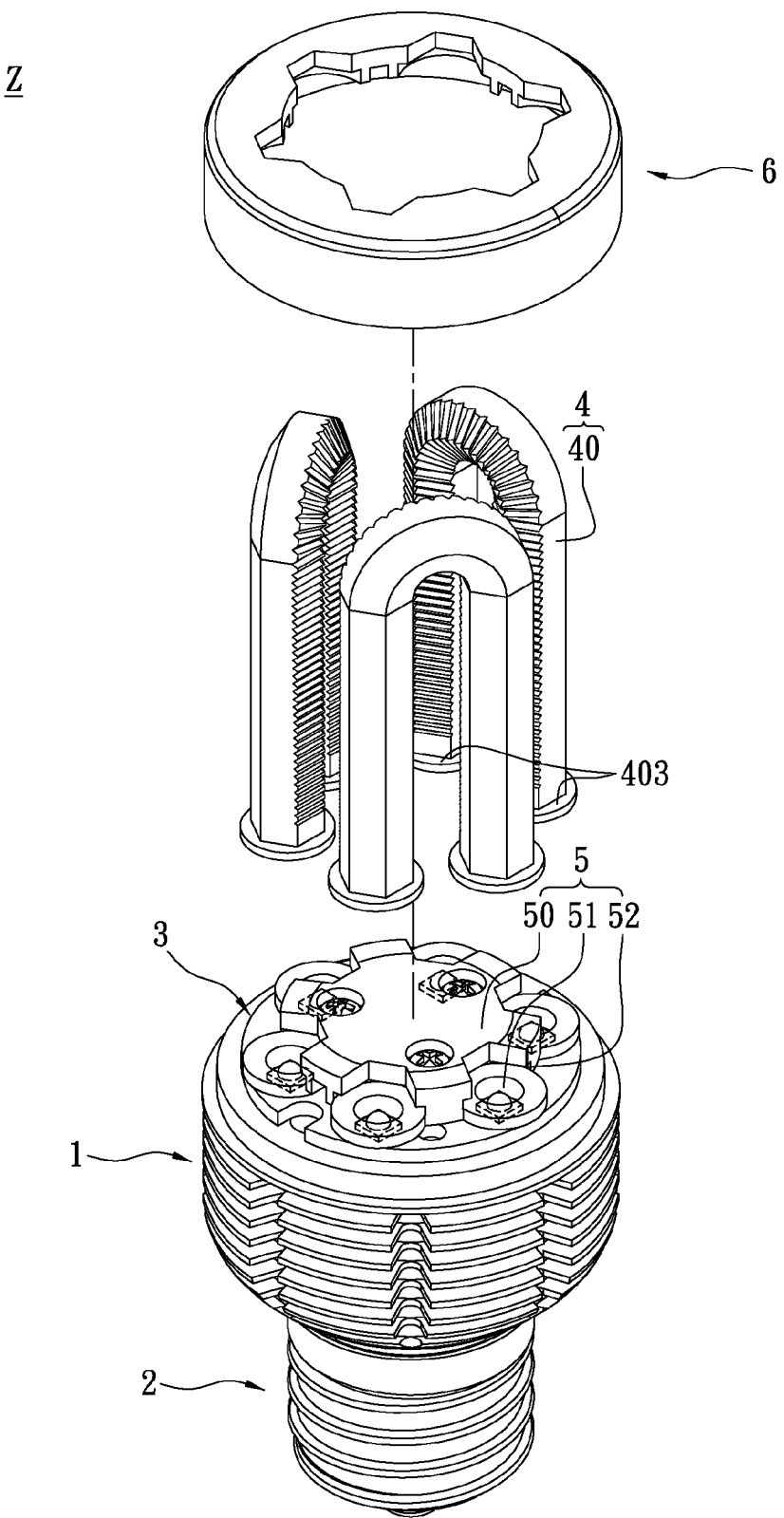
FIG. 1B shows a partial, perspective, assembled, schematic view of the light-guiding type illumination device according to the first embodiment of the instant disclosure.
Figure 1C:
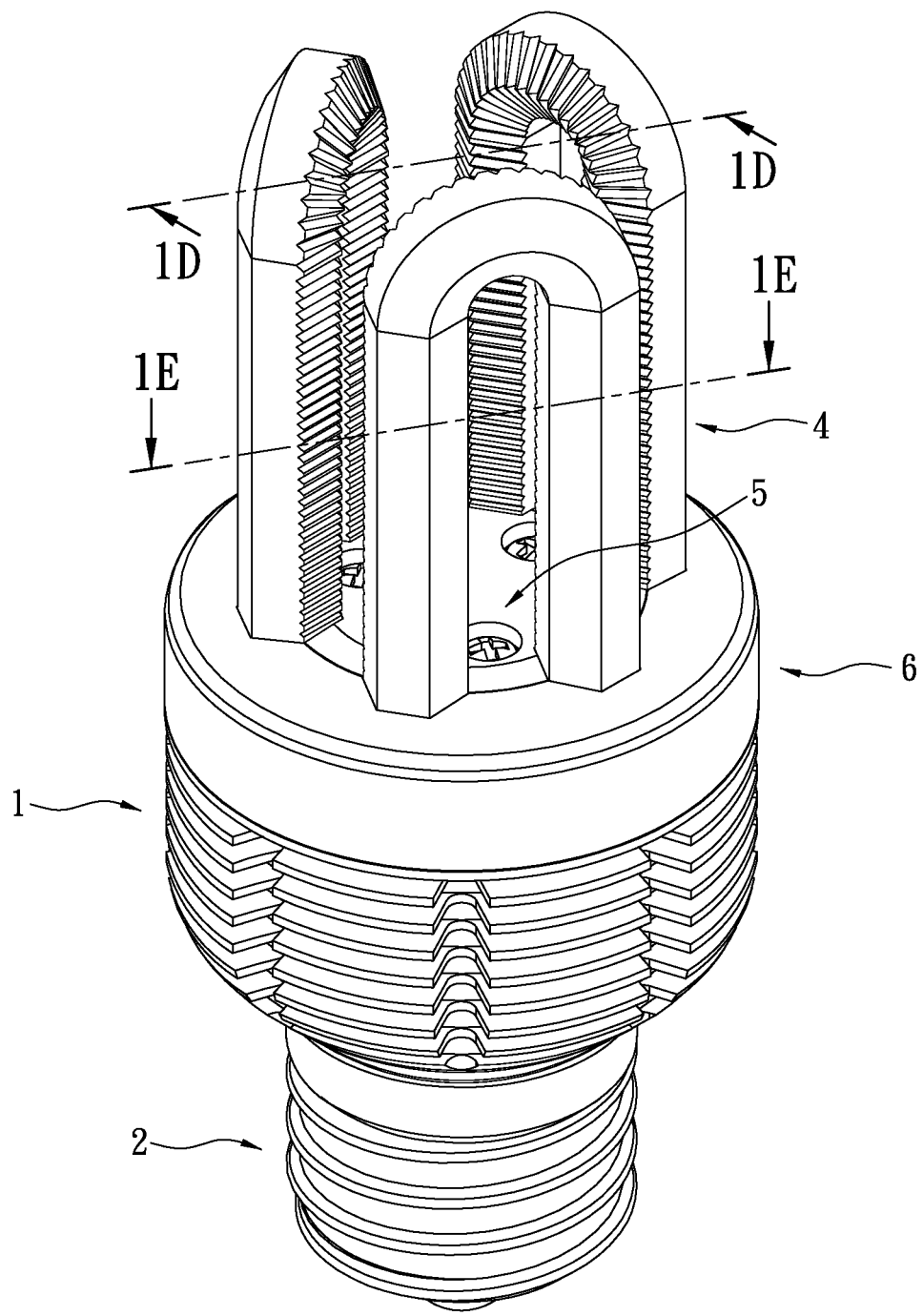
FIG. 1C shows a perspective, assembled, schematic view of the light-guiding type illumination device according to the first embodiment of the instant disclosure.
Figure 1D:
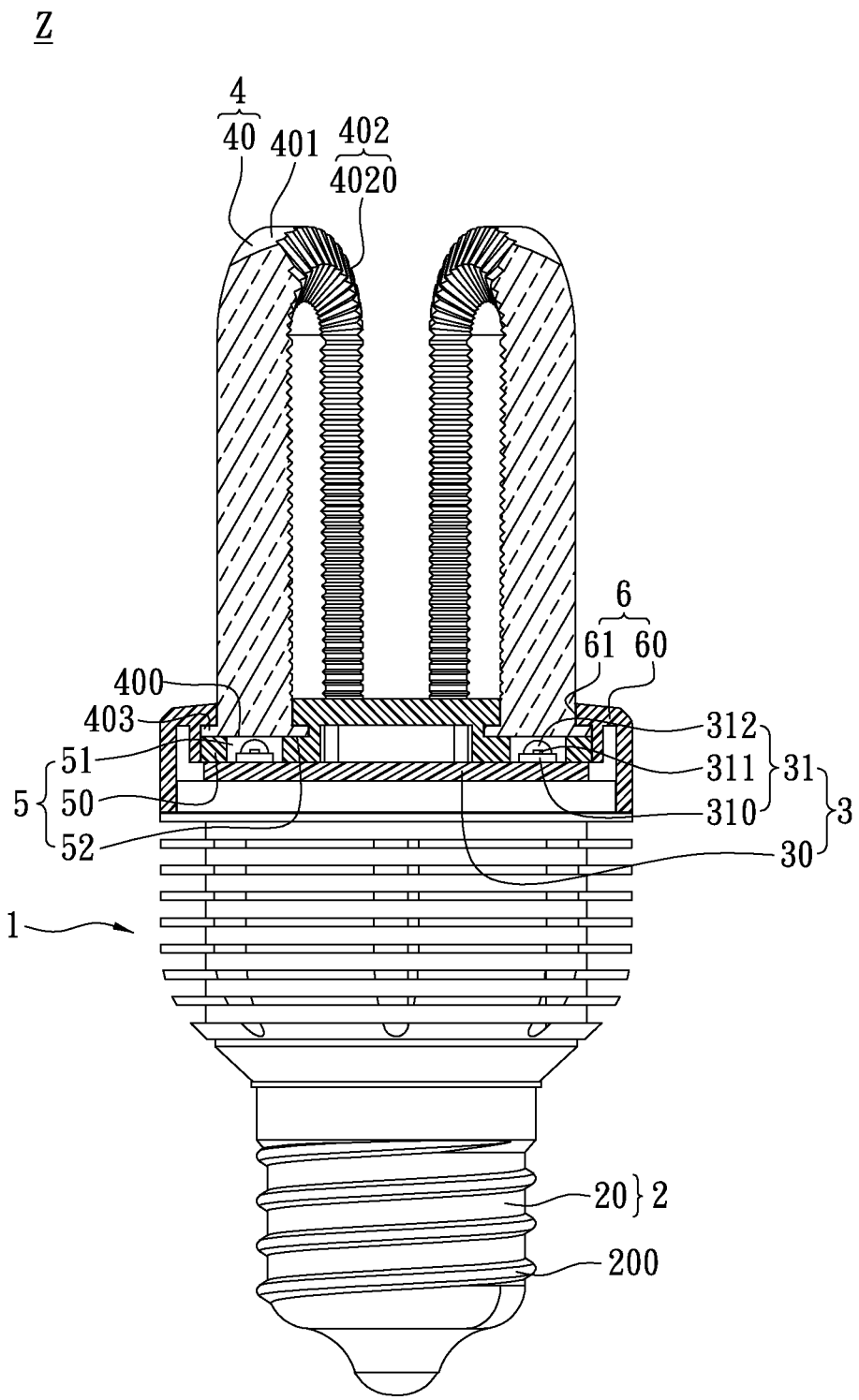
FIG. 1D shows a partial, cross-sectional, schematic view taken along the section line 1D-1D of FIG. 1C.
Figure 1E:
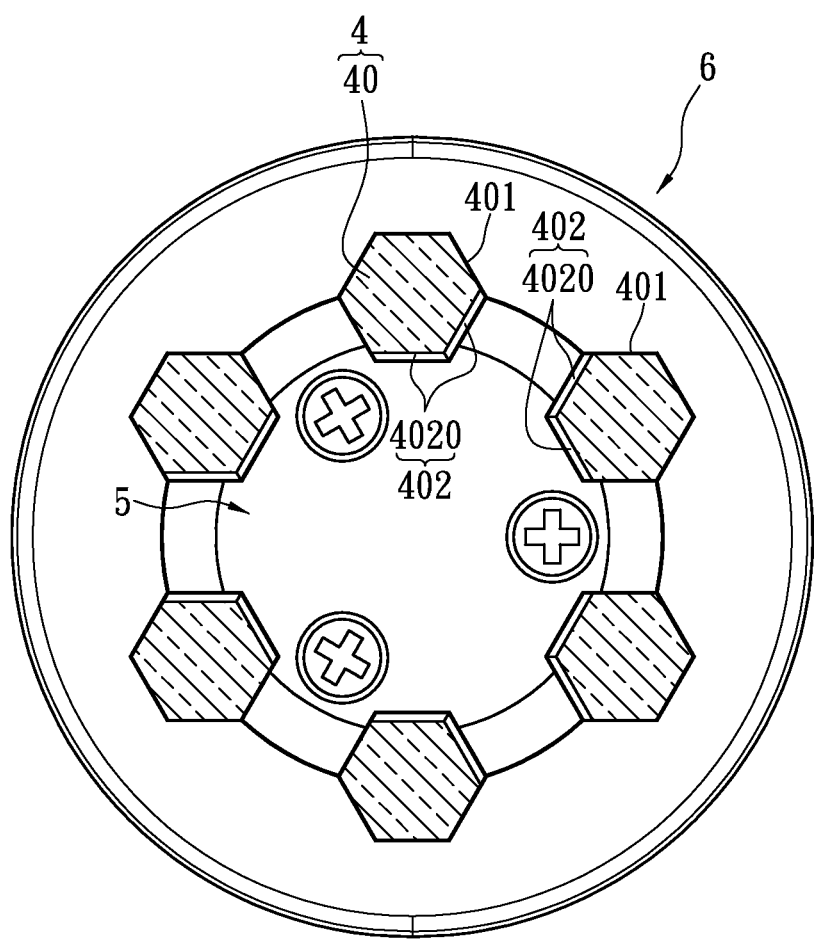
FIG. 1E shows a cross-sectional, schematic view taken along the section line 1E-1E of FIG. 1C.

Referring to FIG. 1A or 1D, the conductive unit 2 is disposed on a first side 101 of the heat-dissipating body 10, such as the bottom side of the heat-dissipating body 10. For example, the conductive unit 2 may be an electrical connector 20 having a securing screw 200 formed on the external surface of the electrical connector 20, thus the electrical connector 20 of the illumination device Z can be positioned in a power socket (not shown) by rotating to obtain power supply. In addition, the instant disclosure can install a drive IC module (not shown) inside the heat-dissipating unit 1, the conductive unit 2, or between the heat-dissipating unit 1 and the conductive unit 2. The drive IC module can be electrically connected between the conductive unit 2 and the light-emitting unit 3 in order to transform voltage from AC (alternating current) into DC (Direct current).

Referring to FIG. 1A, the light-emitting unit 3 is disposed on a second side 102 of the heat-dissipating body 10, such as the top side of the heat-dissipating body 10. The light-emitting unit 3 includes a circuit substrate 30 disposed on the second side 102 of the heat-dissipating body 10 and electrically connected to the conductive unit 2 and at least one light-emitting element 31 disposed on the circuit substrate 30 and electrically connected to the circuit substrate 30. For example, referring to FIG. 1D, this embodiment uses a plurality of light-emitting elements 31, and each light-emitting element 31 may be a LED package structure for generating white, yellow or other color light. The LED package structure includes a LED substrate 310 disposed on the circuit substrate 30 and electrically connected to the circuit substrate 30, at least one LED chip 311 as shown in FIG. 1D (or more LED chips 311) electrically connected to the LED substrate 310, and a package resin body 312 covering the at least one or more LED chips 311. In other words, when a user wants the illumination device Z to generate white or yellow light, the at least one or more LED chips 311 can be covered with the package resin body 312 having a wavelength-converting function, where each LED chip 311 may be a blue LED chip and the package resin body 312 may be a phosphor resin formed by mixing phosphor powders with silicon or epoxy. Of course, each LED chip 311 also can be a white LED chip, thus the white LED chip can be covered with a transparent resin body to generate white light directly. In addition, each LED chip 311 can also be directly electrically connected to the circuit substrate 30 by a COB (Chip On Board) manner. However, the light-emitting element 31 used in this embodiment is merely an example and is not meant to limit the instant disclosure, thus any structure having a light-emitting function can be applied to the instant disclosure.

Referring to FIG. 1A to FIG. 1D, the light-guiding unit 4 includes at least one light-guiding element 40 disposed above the light-emitting unit 3 for receiving light beams (not shown) generated by the light-emitting unit 3. In addition, the light-guiding element 40 has a light input surface 400 formed on a bottom side thereof for receiving the light beams (not shown) and an optical surface-treated layer (i.e., a surface-treated optical layer that is exactly an optical layer after surface treatment) formed on at least one lateral surface thereof.

For example, this embodiment uses a plurality of light-guiding elements 40, and the light-guiding elements 40 can surround an assembly axis A (as shown in FIG. 1A) of the light-guide type illumination device Z and can be arranged symmetrically. Each light-guiding element 40 may be a U-shaped solid light-guiding bar, and two ends of each light-guiding element 40 may be two planes or two surfaces with any shape (such as a recessed shape) for respectively facing two corresponding light-emitting elements 31. Moreover, the optical surface-treated layer can be formed on two lateral surface of each light-guiding element 40, the other lateral surfaces of each light-guiding element 40 can be connected to one another sequentially to form a light output surface 401, and the optical surface-treated layer may be a light-reflecting layer 402 corresponding to the light output surface 401 for reflecting the light beams (not shown). The light-reflecting layer 402 can be composed of a plurality of micro light-guiding structures 4020, and each micro light-guiding structure 4020 may be one of a convex body and a concave body. In other words, each light-guiding element 40 has two light input surfaces 400 respectively formed on the two ends thereof, and the two light input surfaces 400 of each light-guiding element 40 respectively face the two corresponding light-emitting elements 31, thus the light beams (not shown) generated by each light-emitting elements 31 can be projected into each corresponding light-guiding element 40 directly to reduce lateral stray light on the light-guiding elements 40 by using the light-reflecting layer 402. It deserves to be mentioned that the light-guiding unit 4 can use one light-guiding element 40 or more light-guiding elements 40, and the amount, the structure, and the assembly position of the light-guiding element 40 are merely examples and are not meant to limit the instant disclosure.

For example, each micro light-guiding structure 4020 may be a convex body (such as arc shape, cylindrical shape, prism shape, etc.) or a concave body (such as arc shape, cylindrical shape, V shape, etc.), and the micro light-guiding structures 4020 can be formed by any surface treatment technique such as surface etching, surface fogging, etc. Each micro light-guiding structure 4020 has a vertex angle substantially between 60 degree and 100 degree according to different requirements, preferably between 85 degree and 95 degree. For example, the vertex angle may be 90 degree in this embodiment. Furthermore, referring to FIG. 1E, each light-guiding element 40 may be a hexagonal prism, and the hexagonal prism has a hexagonal cross-section. In addition, some of the micro light-guiding structures 4020 of each light-guiding element 40 can be formed in face-to-face relation, and another some of the micro light-guiding structures 4020 of each light-guiding element 40 can face the assembly axis A as shown in FIG. 1A.

However, the above-mentioned definition of the cross-section shape of each light-guiding element 40 or the position of forming the micro light-guiding structures 4020 is merely an example and is not meant to limit the instant disclosure, thus the light-guiding element 40 with any cross-section shape (such as polygon, circle, wedge etc.) and the micro light-guiding structures 4020 on any position of the light-guiding element 40 can be applied to the instant disclosure.

Referring to FIGS. 1A, 1B and 1D, the light-guide type illumination device Z further comprises a positioning unit 5 including a positioning body 50 disposed on the light-emitting unit 3 (for example, the positioning body 50 can be fixed on the light-emitting unit 3 by a plurality of screws S), at least one through hole 51 or a plurality of through holes 51 passing through the positioning body 50 and respectively corresponding to the light-emitting elements 31, and at least one retaining groove 52 or a plurality of retaining grooves 52 respectively corresponding to the through holes 51. For example, the positioning unit 5 can use a plurality of through holes 51 and retaining grooves 52 in this embodiment and each light-guiding element 40 includes two retaining portions 403 respectively formed on two ends thereof, thus each retaining portion 403 can be retained inside each corresponding retaining groove 52 for accurately positioning the two ends of each corresponding light-guiding element 40 to respectively face two corresponding light-emitting elements 31. Of course, when the positioning unit 5 uses at least one through hole 51 and at least one retaining groove 52, each light-guiding element 40 includes at least one retaining portion 403 formed on the bottom side thereof and retained inside the at least one retaining groove 52 for accurately positioning the bottom side of the light-guiding element 40 to face the light-emitting element 31.

Moreover, the light-guide type illumination device Z further comprises a cover unit 6 including a cover body 60 and an opening 61. The cover body 60 can be mated with the heat-dissipating unit 1 to enclose the light-emitting unit 3, the opening 61 can pass through the cover body 60, and each light-guiding element 40 can pass through the opening 61 of the cover unit 6.

Figure 1F:
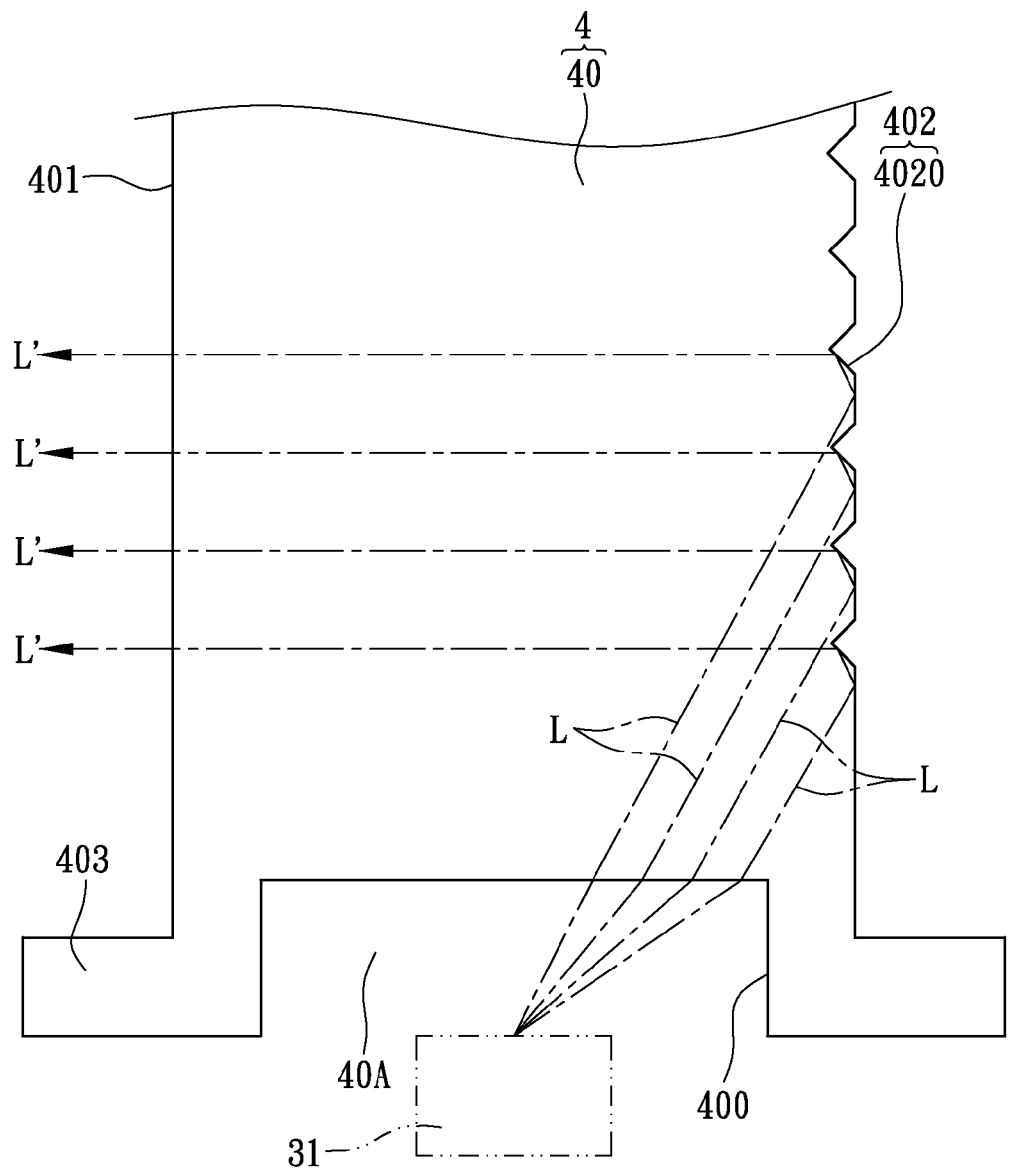
FIG. 1F shows a partial, enlarged, schematic view and an optical path schematic view of another light-guiding element provided by the light-guiding type illumination device according to the first embodiment of the instant disclosure.

Referring to FIG. 1F, this embodiment can provide another light-guiding element 40. The light-guiding element 40 has a recessed portion 40A formed on the bottom side thereof to receive the light-emitting element 31, and the light input surface 400 can be a refracting surface formed on an inner surface of the recessed portion 40A. Hence, when light beams L generated by the light-emitting element 31 are transmitted into the light-guiding element 40 through the light input surface 400, the light beams L can be totally reflected by the micro light-guiding structures 4020 to form a reflected light beams L' due to the total reflection function of the micro light-guiding structures 4020, thus the reflected light beams L' can efficiently leave the light-emitting element 40 from the light output surface 401 in order to increase the lateral illumination of the illumination device Z.

In conclusion, referring to FIG. 1A to FIG. 1C, the heat-dissipating unit 1, the conductive unit 2, the light-emitting unit 3, the light-guiding unit 4, the positioning unit 5 and the cover unit 6 can be assembled sequentially along the assembly axis A (as shown in FIG. 1A) to form the light-guide type illumination device Z (as shown in FIG. 1C). When the illumination device Z is electrically connected to the power socket (not shown) to obtain power supply, the light beams L generated by the light-emitting unit 3 can be projected into the light-guiding unit 4. In other words, referring to FIG. 1F, when light beams L generated by the light-emitting element 31 are transmitted into the light-guiding element 40 through the light input surface 400, the light beams L can be totally reflected by the micro light-guiding structures 4020 to form a reflected light beams L' due to the total reflection function of the micro light-guiding structures 4020, thus the reflected light beams L' can efficiently leave the light-emitting element 40 from the light output surface 401 to show an annular 360-degree light-emitting range without glare.

Second Embodiment

Referring to FIG. 2A to FIG. 2D, where the second embodiment of the instant disclosure provides a light-guide type illumination device Z. Comparing FIG. 2B with FIG. 1D and comparing FIG. 2C and FIG. 1E, the difference between the second embodiment and the first embodiment is as follows: in the second embodiment, the optical surface-treated layer may be a light-scattering layer 402' that can correspond to the light output surface 401 and can be used as a light-scattering surface for uniformly scattering the light beams L generated by the light-emitting element 31.

Figure 2A:
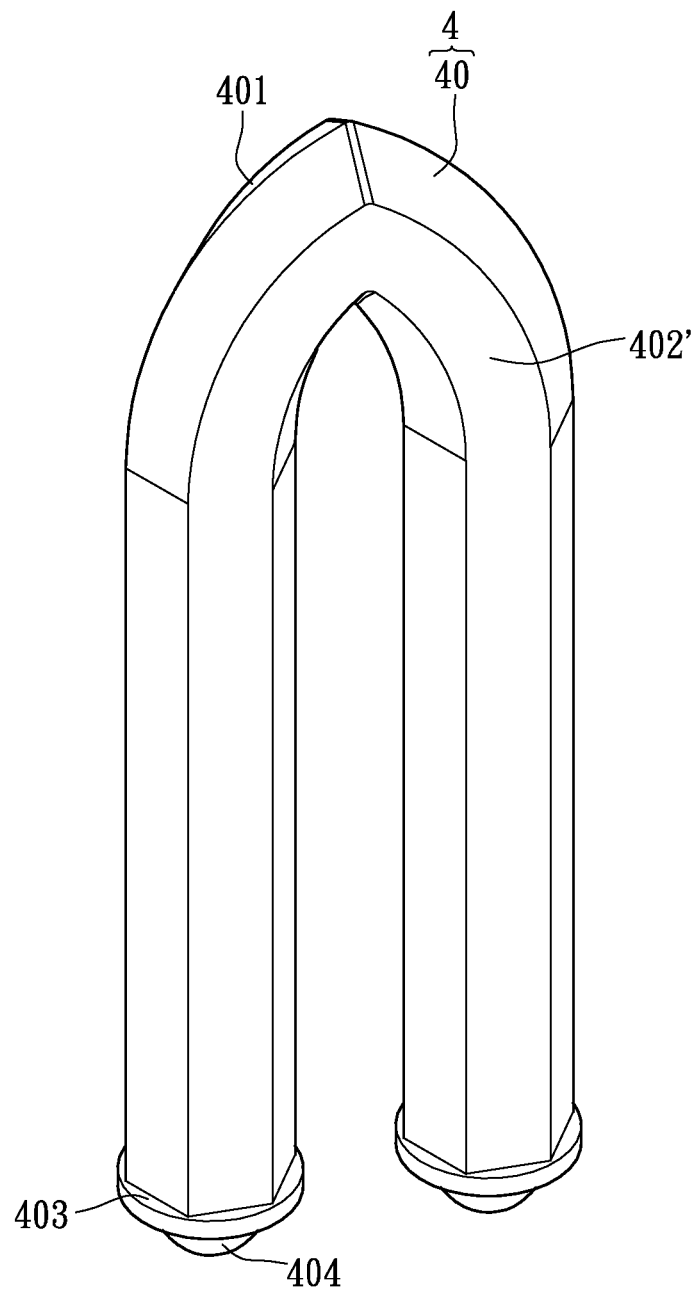
FIG. 2A shows a perspective, schematic view of the light-guiding element of the light-guiding type illumination device according to the second embodiment of the instant disclosure.
Figure 2B:
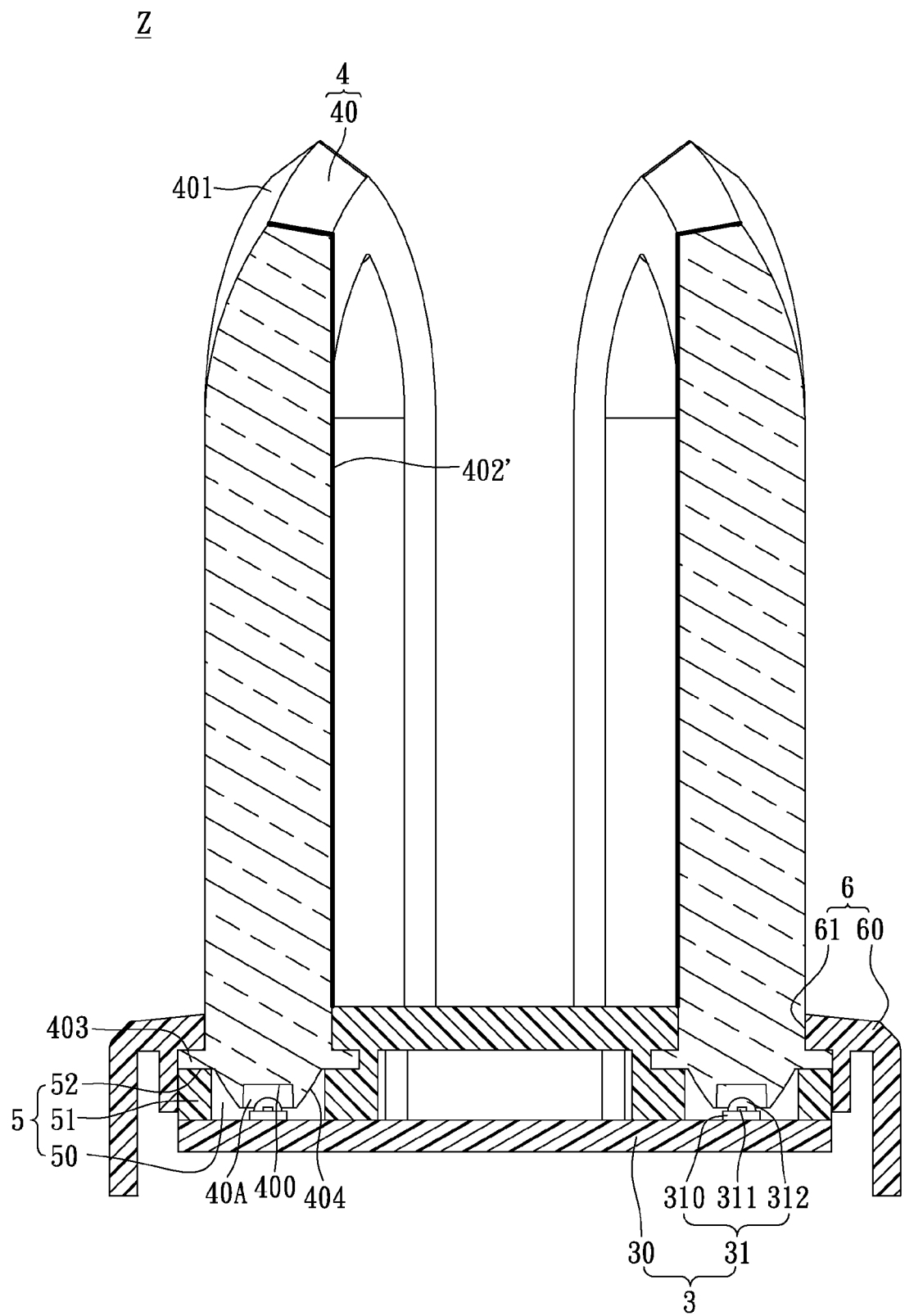
FIG. 2B shows a partial, cross-sectional, schematic view of the light-guiding type illumination device according to the second embodiment of the instant disclosure.
Figure 2C:
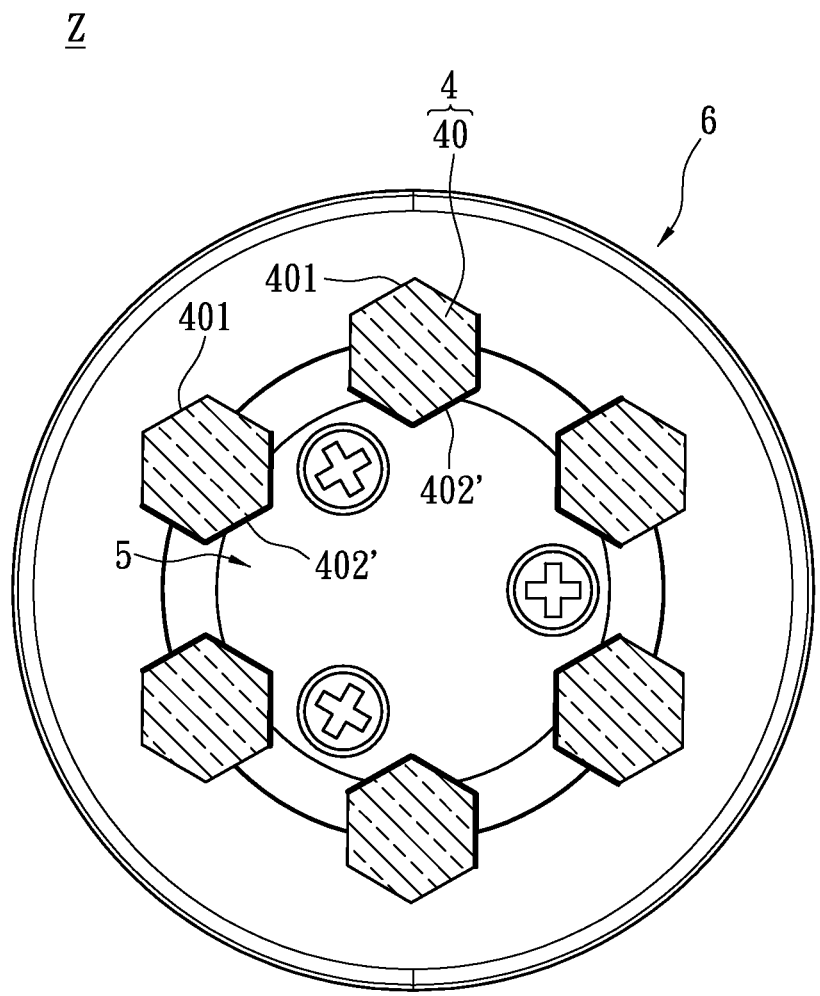
FIG. 2C shows another partial, cross-sectional, schematic view of the light-guiding type illumination device according to the second embodiment of the instant disclosure.

For example, the light-scattering layer 402' may be a white paint layer formed by coating white paints with high scattering material on the at least one lateral surface of the light-guiding element 40, thus the light-guiding element 40 can be used as a perfect reflecting diffuser that has a 100% reflective, Lambertian surface. Furthermore, each light-guiding element 40 may be a hexagonal prism having six lateral surfaces as shown in FIG. 2C, where three of the six lateral surfaces are transparent surface, and the other three lateral surfaces are coated by white paints with high scattering material to form three light-scattering layers 402'. However, the light-scattering layer 402' used in this embodiment is merely an example and is not meant to limit the instant disclosure. Moreover, the light-guiding element 40 has a recessed portion 40A formed on the bottom side thereof, the light input surface 400 can be a refracting surface formed on an inner surface of the recessed portion 40A, and the light-guiding element 40 further has a surrounding total reflection inclined surface 404 connected to the inner surface of the recessed portion 40A and surrounding the recessed portion 40A.

Figure 2D:
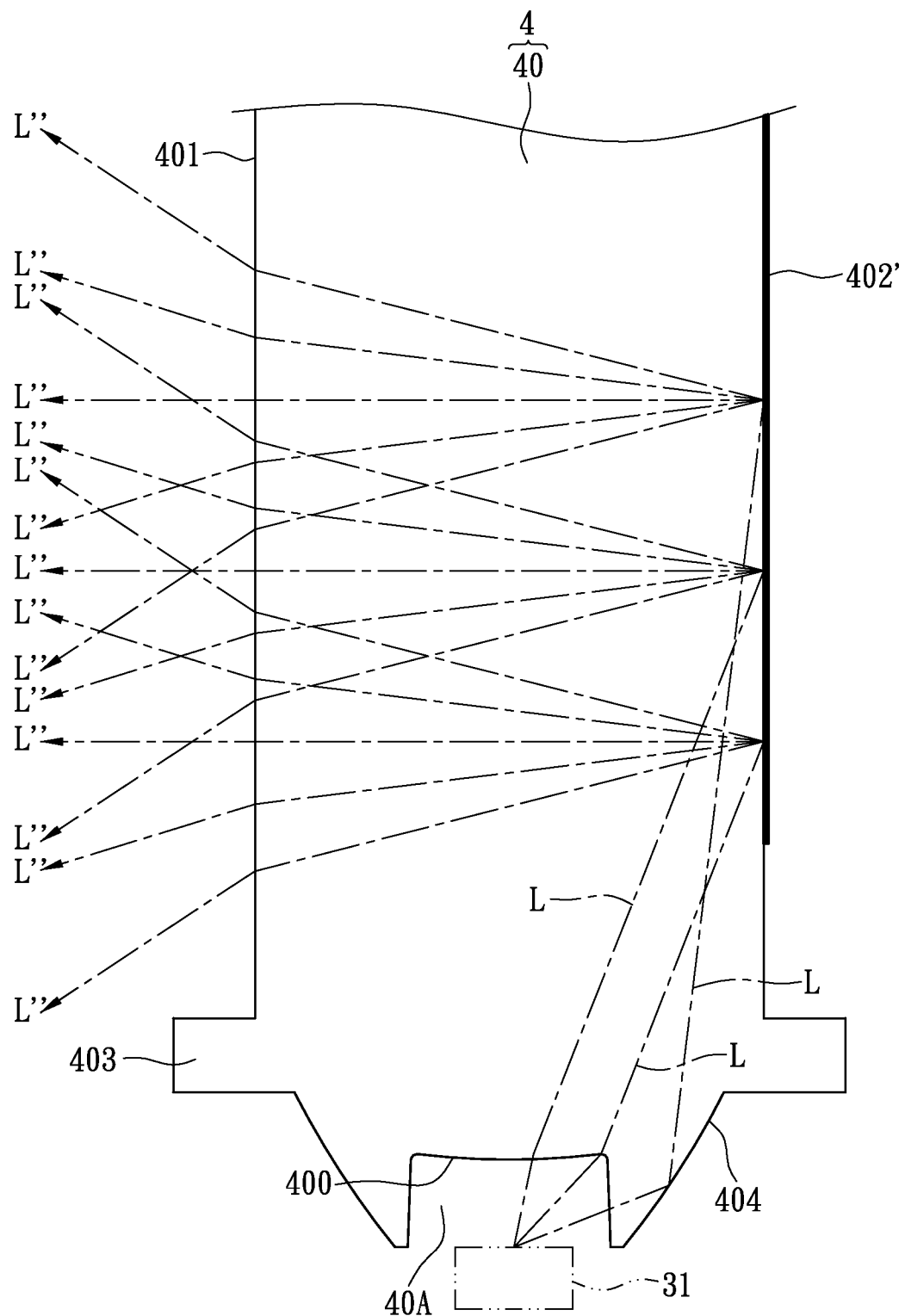
FIG. 2D shows a partial, enlarged, schematic view and an optical path schematic view of the light-guiding element of the light-guiding type illumination device according to the second embodiment of the instant disclosure.

Hence, referring to FIG. 2D, when light beams L generated by the light-emitting element 31 are transmitted into the light-guiding element 40 through the light input surface 400 (such as the refracting surface), the light beams L can be scattered by the light-scattering layers 402' to form scattered light beams L", thus the scattered light beams L" can efficiently leave the light-emitting element 40 from the light output surface 401 to show an annular 360-degree light-emitting range without glare. In addition, the scattered light beams L" projected from the light-guiding element 40 of the illumination device Z can be mixed with each other, thus not only the illumination device Z can provide a lateral light-emitting effect, but also the luminous uniformity and the light emitting efficiency of the illumination device Z can be increased.

Referring to FIG. 2D, the surrounding total reflection inclined surface 404 is designed on the bottom portion of the light-emitting element 40 to connect to the inner surface of the recessed portion 40A and surround the recessed portion 40A, thus when the light beams L generated by the light-emitting element 31 are projected into the light-guiding element 40 through the light input surface 400, some of the light beams L can be reflected by the surrounding total reflection inclined surface 404 in order to be transmitted to a position far away from the light-emitting unit 3, and then the light beams L can be scattered by the light-scattering layers 402' to form scattered light beams L". Hence, the light emitting efficiency of the illumination device Z can be increased due to the usage of the surrounding total reflection inclined surface 404.

Furthermore, comparing FIG. 2A with FIG. 1A, the difference between the second embodiment and the first embodiment is further shown as follows: the light-guiding element 40 has a cuspate top formed on the top portion of the U-shaped solid light-guiding bar. The some emitted light beams L through the top of the light-emitting element 31 can be projected into the light-guiding element 40 and can be scattered by the light-scattering layers 402' to form the scattered light beams L", and the scattered light beams L" can leave the light-guiding element 40 from the light output surface 401 on the cuspate top of the light-guiding element 4. Therefore, the illumination device Z not only can provide a lateral light source, but also can provide an upward light source, thus the light-emitting efficiency of the illumination device Z can be increased and an omni-directional uniform lighting effect can be presented visually to the user.

In conclusion, the instant disclosure can provide an annular 360-degree light-emitting range by matching the light-emitting unit and the light-guiding unit, thus any type of conventional energy-saving bulb can be replaced by the light-guide type illumination device.

Furthermore, the conventional energy-saving bulb can be directly replaced by the illumination device of the instant disclosure without changing the entirety of the original lighting fixture, thus the instant disclosure not only can effectively increase the desire of the user to replace the conventional energy-saving bulb, but also can certainty increase the energy-saving effect and solve the problem of the mercury pollution.

The above-mentioned descriptions merely represent the preferred embodiments of the instant disclosure, without any intention or ability to limit the scope of the instant disclosure which is fully described only within the following claims Various equivalent changes, alterations or modifications based on the claims of instant disclosure are all, consequently, viewed as being embraced by the scope of the instant disclosure.

What is claimed is:

1. A light-guide type illumination device, comprising:
a heat-dissipating unit including a heat-dissipating body;
a conductive unit disposed on a first side of the heat-dissipating body;
a light-emitting unit disposed on a second side of the heat-dissipating body, wherein the light-emitting unit includes at least one light-emitting element electrically connected to the conductive unit for generating light beams; and
a light-guiding unit including at least one light-guiding element disposed above the light-emitting unit, wherein the at least one light-guiding element has a light input surface formed on a bottom side thereof for receiving the light beams and a surface-treated optical layer formed on at least one lateral surface thereof.

2. The light-guide type illumination device of claim 1, wherein the at least one light-emitting element is a LED package structure.

3. The light-guide type illumination device of claim 1, wherein the other lateral surfaces of the at least one light-guiding element are connected to one another sequentially to form a light output surface, and the surface-treated optical layer is a light-reflecting layer corresponding to the light output surface for reflecting the light beams.

4. The light-guide type illumination device of claim 3, wherein the light-reflecting layer is composed of a plurality of micro light-guiding structures, and each micro light-guiding structure is one of a convex body and a concave body.

5. The light-guide type illumination device of claim 1, wherein the other lateral surfaces of the at least one light-guiding element are connected to one another sequentially to form a light output surface, and the surface-treated optical layer is a light-scattering layer corresponding to the light output surface for uniformly scattering the light beams.

6. The light-guide type illumination device of claim 5, wherein the at least one light-guiding element has a recessed portion formed on the bottom side thereof, the light input surface is a refracting surface formed on an inner surface of the recessed portion, and the at least one light-guiding element has a surrounding total reflection inclined surface connected to the inner surface of the recessed portion and surrounding the recessed portion.

7. The light-guide type illumination device of claim 5, wherein the light-scattering layer is a white paint layer formed by coating white paints with high scattering material on the at least one lateral surface of the at least one light-guiding element.

8. The light-guide type illumination device of claim 1, wherein the at least one light-guiding element is a U-shaped solid light-guiding bar, and the at least one light-guiding element has two ends facing the at least one light-emitting element.

9. The light-guide type illumination device of claim 1, wherein the at least one light-guiding element is a U-shaped solid light-guiding bar having a cuspate top formed on the top portion thereof, and the at least one light-guiding element has two ends facing the at least one light-emitting element.

10. The light-guide type illumination device of claim 1, wherein the at least one light-guiding element is a hexagonal prism having a hexagonal cross-section, and the surface-treated optical layer faces an assembly axis of the light-guide type illumination device.

11. The light-guide type illumination device of claim 1, further comprising: a positioning unit including a positioning body disposed on the light-emitting unit, at least one through hole passing through the positioning body and corresponding to the at least one light-emitting element, and at least one retaining groove corresponding to the at least one through hole.

12. The light-guide type illumination device of claim 11, wherein the at least one light-guiding element includes at least one retaining portion formed on the bottom side thereof and retained inside the at least one retaining groove for positioning the bottom side of the at least one light-guiding element to face the at least one light-emitting element.

13. The light-guide type illumination device of claim 1, further comprising: a cover unit including a cover body mated with the heat-dissipating unit to enclose the light-emitting unit and an opening passing through the cover body, wherein the at least one light-guiding element passes through the opening of the cover unit.

14. A light-guiding unit for a LED light source device, comprising:
at least one U-shaped light-guiding element, wherein the at least one U-shaped light-guiding element has a light input surface formed on a bottom side thereof for receiving light beams generated by a LED light source of the LED light source device and a surface-treated optical layer formed on at least one lateral surface thereof.

15. The light-guiding unit of claim 14, wherein the other lateral surfaces of the at least one U-shaped light-guiding element are connected to one another sequentially to form a light output surface, and the surface-treated optical layer is a light-reflecting layer corresponding to the light output surface for reflecting the light beams.

16. The light-guiding unit of claim 15, wherein the light-reflecting layer is composed of a plurality of micro light-guiding structures, and each micro light-guiding structure is one of a convex body and a concave body.

17. The light-guiding unit of claim 14, wherein the other lateral surfaces of the at least one U-shaped light-guiding element are connected to one another sequentially to form a light output surface, and the surface-treated optical layer is a light-scattering layer corresponding to the light output surface for uniformly scattering the light beams.

18. The light-guiding unit of claim 17, wherein the at least one U-shaped light-guiding element has a recessed portion formed on the bottom side thereof, the light input surface is a refracting surface formed on an inner surface of the recessed portion, and the at least one U-shaped light-guiding element has a surrounding total reflection inclined surface connected to the inner surface of the recessed portion and surrounding the recessed portion.

19. The light-guiding unit of claim 17, wherein the light-scattering layer is a white paint layer formed by coating white paints with high scattering material on the at least one lateral surface of the at least one U-shaped light-guiding element.

20. The light-guiding unit of claim 14, wherein the at least one U-shaped light-guiding element has a cuspate top formed on the top portion thereof, and the at least one U-shaped light-guiding element has two ends facing the LED light source.

21. The light-guiding unit of claim 14, wherein the at least one U-shaped light-guiding element is a hexagonal prism having a hexagonal cross-section.

22. The light-guiding unit of claim 14, wherein the at least one U-shaped light-guiding element includes at least one retaining portion formed on the bottom side thereof.

* * * * *